United States Patent
Curtis

(10) Patent No.: US 8,375,053 B2
(45) Date of Patent: *Feb. 12, 2013

(54) FUZZY KEYWORD SEARCHING

(75) Inventor: Scott Curtis, Durham, NC (US)

(73) Assignee: Abo Enterprises, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,226

(22) Filed: Apr. 28, 2011

(65) Prior Publication Data

US 2012/0072457 A1 Mar. 22, 2012

Related U.S. Application Data

(63) Continuation of application No. 12/100,457, filed on Apr. 10, 2008, now Pat. No. 7,958,107.

(51) Int. Cl.
*G06F 7/00* (2006.01)
*G06F 17/30* (2006.01)

(52) U.S. Cl. ........ 707/780; 707/791; 715/857; 715/858; 706/1; 706/52

(58) Field of Classification Search .............. 707/706, 707/709, 765, 780, E17.014, E17.047, E17.069, 707/791, 999.005; 709/203, 217, 219; 715/205, 715/234, 700, 857, 858; 706/1, 8, 52

See application file for complete search history.

(56) References Cited

U.S. PATENT DOCUMENTS

| | | | |
|---|---|---|---|
| 5,606,690 A | 2/1997 | Hunter et al. | |
| 5,652,881 A | 7/1997 | Takahashi et al. | |
| 5,704,060 A | 12/1997 | Del Monte | |
| 6,018,735 A | 1/2000 | Hunter | |
| 6,070,160 A | 5/2000 | Geary | |
| 6,118,385 A * | 9/2000 | Leard et al. | 340/688 |
| 6,332,138 B1 | 12/2001 | Hull et al. | |
| 6,494,880 B1 * | 12/2002 | Swanson et al. | 606/40 |
| 6,714,936 B1 * | 3/2004 | Nevin, III | 707/E17.011 |
| 6,748,376 B1 | 6/2004 | Beall et al. | |
| 6,847,960 B1 * | 1/2005 | Li et al. | 707/999.003 |
| 6,907,424 B1 | 6/2005 | Neal et al. | |
| 7,236,969 B1 | 6/2007 | Skillen et al. | |
| 7,289,981 B2 * | 10/2007 | Chang et al. | 707/999.003 |

(Continued)

FOREIGN PATENT DOCUMENTS

CN 1381796 A 11/2002
CN 1601524 A 3/2005

OTHER PUBLICATIONS

Jacco van Ossenbruggen, and Lynda Hardman—"Semantic Timeline Interfaces for Annotated Multimedia Assets"—Integration of Knowledge, Semantics and Digital Media Technology, 2005. EWIMT 2005. The 2nd European Workshop on the (Ref. No. 2005/11099)—Nov. 30, 2005-Dec. 1, 2005—(pp. 289-292).*

(Continued)

*Primary Examiner* — Anh Ly

(57) ABSTRACT

A fuzzy, or ambiguous, keyword searching process and systems for implementing the fuzzy keyword searching process are provided. In general, one or more keyword search terms are first identified for a search. Next, a user is enabled to adjust a logical fuzziness, or logical ambiguity, for each of the one or more keyword search terms. As used herein, logical fuzziness of a keyword search term refers to the extent to which associated keywords are considered for the search. In one embodiment, the user may also be enabled to view and adjust keyword associations for each of the keyword search terms. A search is then performed based on the one or more keyword search terms and the logical fuzziness of the one or more keyword search terms, and results of the search are presented to the user.

17 Claims, 21 Drawing Sheets

U.S. PATENT DOCUMENTS

| | | | |
|---|---|---|---|
| 7,305,428 | B2 | 12/2007 | Sakata |
| 7,383,299 | B1* | 6/2008 | Hailpern et al. ............ 709/203 |
| 7,529,743 | B1 | 5/2009 | Ershov |
| 7,549,915 | B2 | 6/2009 | Duringer |
| 7,693,906 | B1 | 4/2010 | Amidon et al. |
| 7,958,107 | B2 | 6/2011 | Curtis |
| 8,065,286 | B2* | 11/2011 | Jones ............................ 707/706 |
| 2002/0073167 | A1 | 6/2002 | Powell et al. |
| 2002/0083062 | A1* | 6/2002 | Neal et al. ...................... 707/10 |
| 2002/0156845 | A1 | 10/2002 | Sakata |
| 2004/0030490 | A1* | 2/2004 | Hegedus et al. ............ 701/200 |
| 2004/0160971 | A1 | 8/2004 | Krause et al. |
| 2005/0108001 | A1 | 5/2005 | Aarskog |
| 2005/0246391 | A1 | 11/2005 | Gross |
| 2006/0020538 | A1 | 1/2006 | Ram |
| 2006/0064721 | A1 | 3/2006 | Del Val et al. |
| 2006/0107236 | A1 | 5/2006 | Etgen |
| 2007/0260597 | A1* | 11/2007 | Cramer ............................ 707/5 |
| 2008/0016040 | A1* | 1/2008 | Jones et al. ....................... 707/3 |
| 2008/0052285 | A1* | 2/2008 | Chang et al. .......... 707/E17.014 |
| 2008/0133444 | A1 | 6/2008 | Gao et al. |
| 2009/0100019 | A1 | 4/2009 | White et al. |
| 2009/0119328 | A1 | 5/2009 | Raza et al. |
| 2009/0158146 | A1 | 6/2009 | Curtis et al. |
| 2009/0254572 | A1 | 10/2009 | Redlich et al. |
| 2009/0259647 | A1 | 10/2009 | Curtis |
| 2012/0016860 | A1* | 1/2012 | Jones ............................ 707/706 |

OTHER PUBLICATIONS

Gaolin Fang, and Hao Yu—"Web Translation Mining Based on Suffix Arrays"—Journal of Chinese Language and Computing, 2007, 17 (1): (pp. 1-14).*

"About.com: http://quintura.com/," Quintura search results, at <http://websearch.about.com/gi/dynamic/offsite.htm?zi=1/XJ&sdn=web...>, copyright 2007, Quintura Inc., printed Oct. 17, 2007, 2 pages.

Bisdorff, R., "Logical foundation of fuzzy preferential systems with application to the electre decision and methods," Computers and Operations Research, vol. 27, Issue 7-8, Jun. 2000, pp. 673-687, 15 pages.

Hearst, Marti A. et al., "Tag Clouds: Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csdl2.computer.org/persagen/DLAbsToc.jsp?resourcePath=/dl/proceedings/&toc=comp/proceedings/hicss/2008/3075/00/3075toc.xml&DOI=10.1109/HICSS.2008.422>, 10 pages.

Kaser, Owen et al., "Tag-Cloud Drawing: Algorithms for Cloud Visualization," WWW2007, May 8-12, 2007, Banff, Canada, available at <http://www2007.org/workshops/paper_12.pdf>, 10 pages.

"Quintura—A Tag Cloud Engine," at <http://websearch.about.com/od/dailysearchsearchtips/qt/dnt0830.htm?p=1>, copyright 2007, About.com, Inc., printed Oct. 17, 2007, 1 page.

Rouarch, Pierre, "The Cloud Search Beta," at <http://www.itcom3.com/thecloudsearch/aboutthecloudsearch.php>, copyright 2007, Pierre Rouarch, printed Oct. 17, 2007, 2 pages.

Tizhoosh, Hamid R., "Observer-Dependent Sharpening," In Proc. of IEEE International Conference on Image Processing, Sep. 22-25, 2002, Rochester, New York, pp. 816-819, copyright 2002, IEEE, 4 pages.

Zhang, Lei et al., "An Enhanced Model for Searching in Semantic Portals," Proceedings of the 14th International Conference on World Wide Web, May 10-14, 2005, Chiba, Japan, pp. 453-462, 10 pages.

* cited by examiner

KEYWORD SEARCH TERM

Led Zeppelin

SEARCH RESULTS

Money (Pink Floyd)
Hey You (Pink Floyd)
Kashmir (Led Zeppelin)
Black Dog (Led Zeppelin)
Stairway to Heaven (Led Zeppelin)
Immigrant Song (Led Zeppelin)
Over the Hills (Led Zeppelin)
Baba O'Reilly (The Who)
Who Are You (The Who)

*FIG. 3*

Abbey Lincoln  Billy Eckstein  Claude Nugaro

Ella Fitzgerald  Henri Salvador  Irving Berlin

Louis Armstrong  Standards  Veronica Martel

Traditional Pop  Traincha

Vocal Jazz  Vocapella  Zoot Sims

FIG. 5

Abbey Lincoln  Billy Eckstein  Claude Nugaro

Ella Fitzgerald  Henri Salvador  Irving Berlin

Louis Armstrong  Standards  Veronica Martel

Traditional Pop  Traincha

Vocal Jazz  Vocapella  Zoot Sims

*FIG. 6*

Abbey Lincoln  Claude Nugaro

Billy Eckstein  Irving Berlin

Ella Fitzgerald Henri Salvador Standards Veronica Martel

Louis Armstrong

Traditional Pop Traincha Vocapella Zoot Sims

Vocal Jazz

FOCUSED — AMBIGUOUS

*FIG. 15*

FUZZY KEYWORD SEARCHING

RELATED APPLICATIONS

This patent application is a continuation of U.S. patent application Ser. No. 12/100,457, filed Apr. 10, 2008, now U.S. Pat. No. 7,958,107, entitled "FUZZY KEYWORD SEARCHING," the disclosure of which is hereby incorporated herein by reference in its entirety.

FIELD OF THE INVENTION

The present invention relates to keyword searching.

BACKGROUND OF THE INVENTION

In today's digital world, an enormous amount of content is available. Thus, whether the content is stored on a user device such as a personal computer or available to users via the World Wide Web, keyword searching has long been the conventional means for identifying content items of interest to a user. For example, Internet search engines such as the Yahoo! Internet search engine and the Google Internet search engine are both keyword search engines. As another example, personal computers typically include software applications that enable their users to perform keyword searches of content stored on the local hard drives of the personal computers. However, such keyword searching processes are blunt instruments. Users need more powerful and intuitive means to search content.

SUMMARY OF THE INVENTION

The present invention relates to fuzzy, or ambiguous, keyword searching. In general, one or more keyword search terms are first identified for a search. In one embodiment, the keyword search terms are media tags such as, for example, artist tags, album tags, genre tags, and the like associated with digital music. However, the present invention is not limited thereto. Next, a user is enabled to adjust a logical fuzziness, or logical ambiguity, for each of the one or more keyword search terms. As used herein, logical fuzziness of a keyword search term refers to the extent to which associated keywords are considered for the search. The user may be enabled to adjust the logical fuzziness of the keyword search terms individually, in a group-wise fashion, or both individually and in a group-wise fashion. In one embodiment, the user may also be enabled to view and adjust keyword associations for each of the keyword search terms. A search is then performed based on the one or more keyword search terms and the logical fuzziness of the one or more keyword search terms, and results of the search are presented to the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2 through 4 illustrate an exemplary Graphical User Interface (GUI) enabling a user to adjust a logical fuzziness of a keyword search term and presenting corresponding search results to the user as adjustments are made to the logical fuzziness of the keyword search term according to one embodiment of the present invention;

FIGS. 5 through 14 illustrate the exemplary GUI where the user is further enabled to identify multiple keyword search terms, view keyword associations for the keyword search terms, and adjust the keyword associations for the keyword search terms according to one embodiment of the present invention;

FIG. 15 illustrates the exemplary GUI where the user is enabled to adjust the logical fuzziness of the keyword search terms in a group-wise fashion according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to fuzzy, or ambiguous, keyword searching. In general, the fuzzy keyword searching of the present invention may be used in any type of search environment. For example, the keyword searching may be used to search local content such as, for example, a user's media collection stored on the user's personal computer, portable media player, Apple® iPhone, or the like. The user's media collection may include digital music, digital videos, digital images, or the like. As another example, the fuzzy keyword searching may be used to search any type of local content such as, for example, documents, spreadsheets, presentations, digital images, digital music, digital videos, or the like. As a final example, the fuzzy keyword searching of the present invention may be used to search remote content such as content stored by a remote server, content available via peer devices in a Peer-to-Peer (P2P) network, or the like. It should be noted that the examples given above are not intended to limit the scope of the present invention. Numerous other applications of the present invention will be apparent to one of ordinary skill in the art upon reading this disclosure, and such variations are to be considered within the scope of the present invention.

Figure 1:
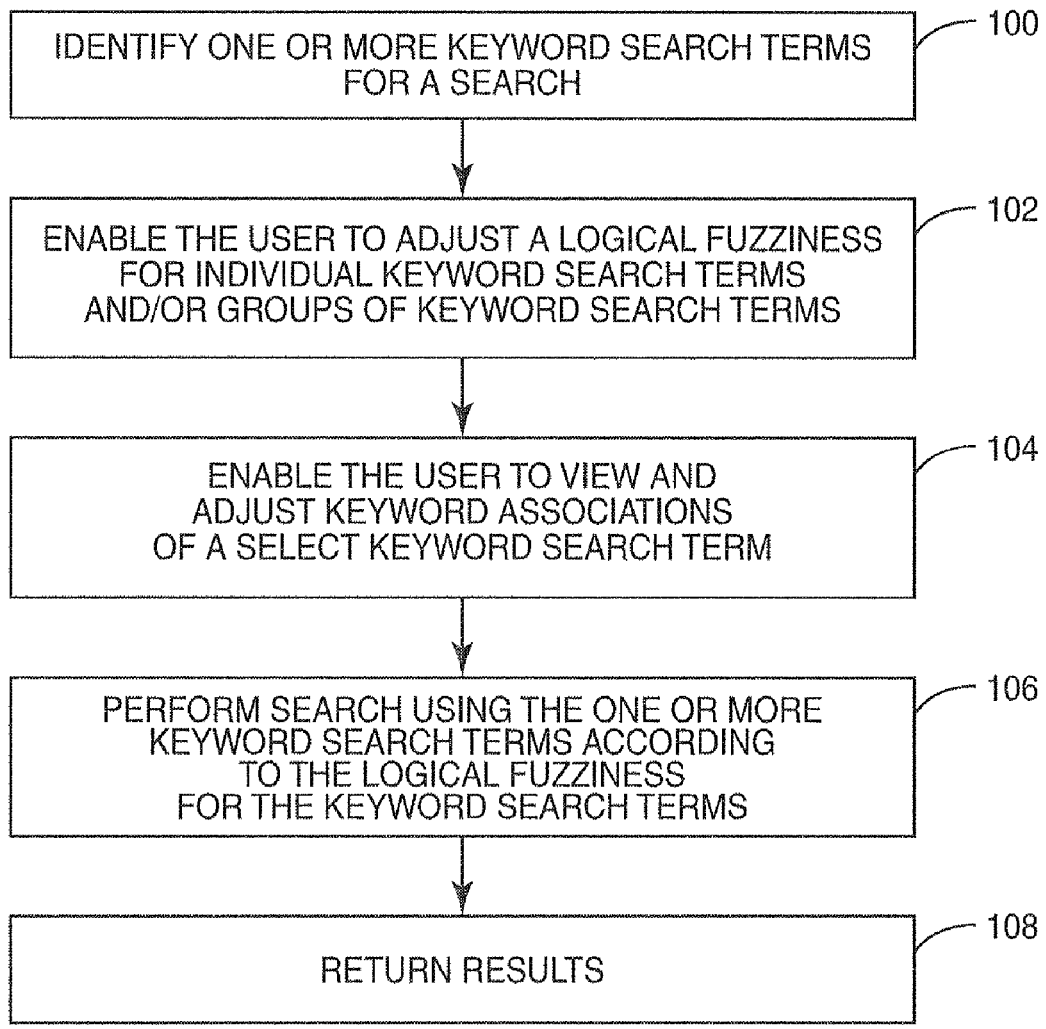
FIG. 1 is a flow chart illustrating a fuzzy keyword search process according to one embodiment of the present invention.

FIG. 1 is a flow chart illustrating an exemplary fuzzy keyword search process according to one embodiment of the present invention. First, one or more keywords defining the search are identified (step 100). The keywords identified for the search are also referred to herein as keyword search terms. The keyword search terms may be, for example, predefined keywords selected by the user from, for example, a list of predefined keywords. In addition or alternatively, the keywords may be textual or alphanumeric keywords entered by the user. The textual or alphanumerical keywords may then be mapped to known keywords in order to identify associated keywords to be used in the fuzzy keyword search process described below. If a mapping does not exist for a particular textual or alphanumeric keyword, the textual or alphanumeric keyword may be identified as a new keyword, in which case the user may be asked to identify associated keywords.

In one embodiment, the keyword search terms are predefined media tags used in association with media items. For example, for a song, the keyword search terms may be one or more genre tags such as "Rock" or "Country," one or more artist tags such as "Aerosmith" or "Garth Brooks," one or more album tags such as "Get a Grip" or "Wild Horses," one or more decade tags such as "1980s" or "1990s," one or more release date tags such as "1982" or "1997," or the like. This may be desirable where the content to be searched is the user's media collection, a media collection hosted by a remote service such as Apple's iTunes store, or the like.

Next, the user is enabled to adjust a logical fuzziness of the keyword search terms (step 102). In the preferred embodiment, the user is enabled to adjust the logical fuzziness of each of the keyword search terms individually. In addition, the keyword search terms may be grouped into one or more groups, and the user may be enabled to adjust the logical fuzziness of the keyword search terms in a group-wise fashion. Thus, the user may be enabled to perform a single adjustment on a group of keyword search terms to thereby adjust the logical fuzziness for each of the keyword search terms in the group. Again, as used herein, the logical fuzziness of a keyword search term is the extent to which associated keywords are considered when performing the fuzzy keyword search.

More specifically, each keyword search term is associated with one or more other keywords, which are referred to herein as associated keywords or keyword associations. For example, if the keyword search terms are media tags, one of the keyword search terms may be the artist tag "Led Zeppelin." The artist tag "Led Zeppelin" may have a close association with the artist tags "Pink Floyd" and "The Who" and a less close association with the artist tags "Cream" and "The Doors." As such, the artist tags "Pink Floyd," "The Who," "Cream," and "The Doors" are referred to herein as associated keywords or keyword associations for the artist tag "Led Zeppelin."

The keyword associations may be defined using any desired technique. For example, the keyword associations may be generated manually, programmatically, or both manually and programmatically. More specifically, in one embodiment, keyword associations are defined by one or more users. For example, a group of music experts may define associations between music tags such as artist tags, genre tags, and the like. As another example, keyword associations may be generated in a collaborative fashion based on input from a number of users. In another embodiment, the keyword associations are programmatically determined based on historical information or the like. For example, a media distribution service such as the Apple iTunes store may identify associations between media tags based on historical purchase information. This historical purchase information may show, for example, that users who have purchased music by Led Zeppelin have also purchased music by The Who. As a result, an association between the artist tag "Led Zeppelin" and the artist tag "The Who" may be inferred. As another example, an Internet search engine such as the Google Internet search engine may infer associations between keywords based on previous searches made by users. It should be noted that numerous techniques for manually or programmatically identifying keyword associations will be apparent to one of ordinary skill in the art. The examples given herein are not intended to limit the scope of the present invention. In general, the keyword associations may be defined using any desired technique.

In one embodiment, the logical fuzziness of each keyword search term may be adjusted from a value of zero (0) to N, where N is any integer greater than one (1). When the logical fuzziness of a keyword search term is set to a value of zero (0), only the keyword search term is used, or considered, for the fuzzy keyword search. No associated keywords are considered. However, as the logical fuzziness of the keyword search term is increased, associated keywords are increasingly considered. For example, the keyword associations may be represented by an ontology or similar data structure. As such, if the logical fuzziness for a keyword search term, or parent keyword, is set to a value of one (1), the fuzzy keyword search considers the keyword search term and other keywords directly associated with the keyword search term in the ontology. When the logical fuzziness for the keyword search term is two (2), the fuzzy keyword search considers the keyword search term as well as keywords within two degrees of separation from the keyword search term in the ontology. Thus, in other words, if the degree of logical fuzziness is two (2), the fuzzy keyword search uses the keyword search term, first level keywords directly related to the keyword search term, and second level keywords indirectly related to the keyword search term via the first level keywords.

As another example, the keyword associations may be stored as lists where each keyword associated with a parent keyword is assigned a weight, or score, defining the degree or strength of association between that keyword and the parent keyword. In one embodiment, the range of weights may inversely correspond to the range of logical fuzziness values. However, the present invention is not limited thereto. For example, if there are ten (10) logical fuzziness values or settings, the keywords associated with a parent keyword may each be assigned a weight ranging from one (1) to ten (10). Thus, for example, when the logical fuzziness for a keyword search term is set to two (2), the fuzzy keyword search uses the keyword search term as well as associated keywords having assigned weights of nine (9) or ten (10). As another example, when the logical fuzziness for a keyword search term is set to three (3), the fuzzy keyword search uses the keyword search term as well as associated keywords having assigned weights of eight (8), nine (9), or ten (10).

The user may also be enabled to view and adjust keyword associations for the keyword search terms (step 104). More specifically, as discussed below, the user may be enabled to select a keyword search term and view at least some of the associated keywords for the selected keyword search term. In addition, the user may be enabled to adjust the keyword associations for the keyword search term. More specifically, the user may be enabled select a keyword search term and delete or remove associated keywords for the selected keyword search term, add associated keywords for the selected keyword search term, adjust weights assigned to the associated keywords or otherwise adjust the degree of association between the associated keywords and the keyword search term, or the like. Further, the user may be enabled to adjust a degree of logical fuzziness of each of the associated keywords for the selected keyword search term. As a result, for a particular associated keyword of a keyword search term, the user may be enabled to adjust the logical fuzziness of that associated keyword such that additional keywords associated with that associated keyword are also considered for the search.

It should be noted that the effect of the adjustments made to the associated keywords may vary depending on the particular implementation. In general, the adjustments to the keyword associations may have a temporary effect for this particular search or a series of searches performed by the user, or a lasting effect on the keyword associations. For example, the adjustments made to the keyword associations may be temporary in that the adjustments are used for this particular search or a series of searches performed by the user. In addition or alternatively, the adjustments made to the keyword associations may have lasting effects. For example, the adjustments may be used to modify the keyword associations permanently until subsequently adjusted, as input in a collaborative process for defining the keyword associations, or the like.

Next, a fuzzy keyword search is performed using the one or more keyword search terms according to the degree of logical fuzziness assigned to the keywords, and results of the search are returned, or presented, to the user (steps 106 and 108). More specifically, a search is performed using the keyword search terms and, for each of the keyword search terms, a number of associated keywords determined by the degree of logical fuzziness assigned to the keyword search term. For each keyword search term, the number of associated keywords used in the fuzzy keyword search increases as the logical fuzziness of the keyword search term is increased and decreases as the logical fuzziness of the keyword search term is decreased. In one embodiment, strength of association is used to determine which associated keywords are considered for the fuzzy keyword search. For example, a current value of the logical fuzziness of the keyword search term may correspond to, or be used to provide, a strength of association threshold. Associated keywords having a strength of association greater than the strength of association threshold are used in the fuzzy keyword search.

Note that any desired underlying searching algorithm may be used. For example, in order to perform the fuzzy keyword search, the keyword search terms and any associated keywords may be provided as input to a known search engine such as, for example, the Google Internet search engine, a search engine of a user device, a search engine embedded within another application such as a media player application, or the like. Alternatively, a custom search engine may be used. In addition, the content searched may vary depending on the particular implementation. In general, the content searched may be any type of local content, remote content, or a combination of local content and remote content. As discussed above, the content searched may be local content such as, for example, media content stored on a user's personal computer, portable media player, Apple® iPhone, or the like. In addition or alternatively, the content searched may be remote content such as, for example, content available to the user via the Internet, a P2P network, a website, a web-based media distribution service such as the iTunes store, or the like.

Figure 2:
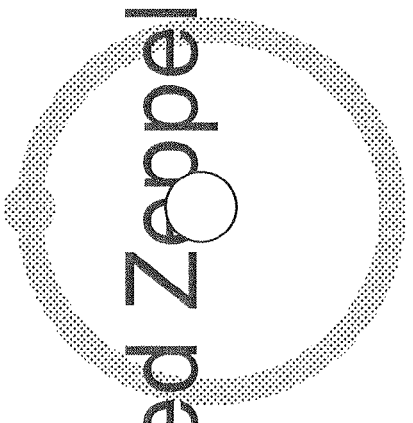

FIGS. 2 through 15 illustrate various aspects of the present invention with respect to an exemplary graphical user interface (GUI) 10. FIG. 2 illustrates the GUI 10 wherein a keyword search term and corresponding search results are presented to the user according to one embodiment of the present invention. In this example, the degree of logical fuzziness for the keyword search term is set to a minimum value, or a value corresponding to an unambiguous or focused search. As a result, only the keyword search term is considered for the search. As such, the search results include only those content items matching the keyword search term. In this example, the keyword search term is the media tag "Led Zeppelin." As such, the search results include only songs tagged with the media tag "Led Zeppelin."

FIG. 3 illustrates adjustment of the logical fuzziness of the keyword search term, "Led Zeppelin," by the user and the corresponding effect on the search results according to one embodiment of the present invention. In one embodiment, the GUI 10 is presented to the user via a touch screen such as that of an Apple® iPhone, and the user is enabled to adjust the logical fuzziness of the keyword search term by rotating a control 12 clockwise and counter-clockwise. However, the present invention is not limited thereto. Other mechanisms may be used to enable the user to control the logical fuzziness of the keyword search term. Also in this embodiment, visual feedback regarding the logical fuzziness for the keyword search term is provided to the user by controlling the visual fuzziness of the keyword in response to adjustments to the logical fuzziness of the keyword search term as the user rotates the control 12. In this example, as compared to FIG. 2, the user has rotated the control 12 to increase the logical fuzziness of the media tag "Led Zeppelin." As a result, the search results include songs tagged with the media tag "Led Zeppelin" as well as songs tagged with associated media tags "Pink Floyd" and "The Who."

Figure 4:
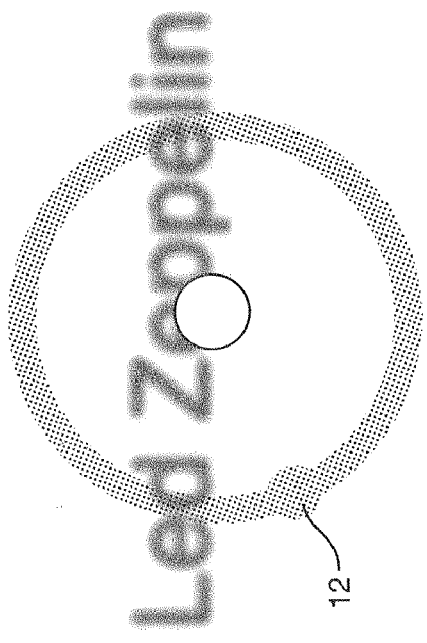

FIG. 4 illustrates a scenario where the user has further increased the logical fuzziness of the keyword search term "Led Zeppelin." As a result, the search results include songs tagged with additional associated media tags "Cream" and "The Doors." Note that, in this embodiment, the increase in the logical fuzziness for the keyword search term "Led Zeppelin" is indicated by the increased visual fuzziness of the keyword search term "Led Zeppelin" in the GUI 10.

FIG. 5 illustrates the GUI 10 wherein multiple keyword search terms have been identified for a fuzzy keyword search according to one embodiment of the present invention. The keyword search terms illustrated in FIG. 5 may be referred to herein as a keyword group. In one embodiment where the content to be searched is media content, the keyword group may also be referred to as a tag group or tag cloud. Again, the keyword search terms may be manually entered or otherwise selected by the user. Alternatively, keyword search terms for the fuzzy keyword search may be suggested to the user programmatically based on, for example, prior searches made by the user.

Figure 7:
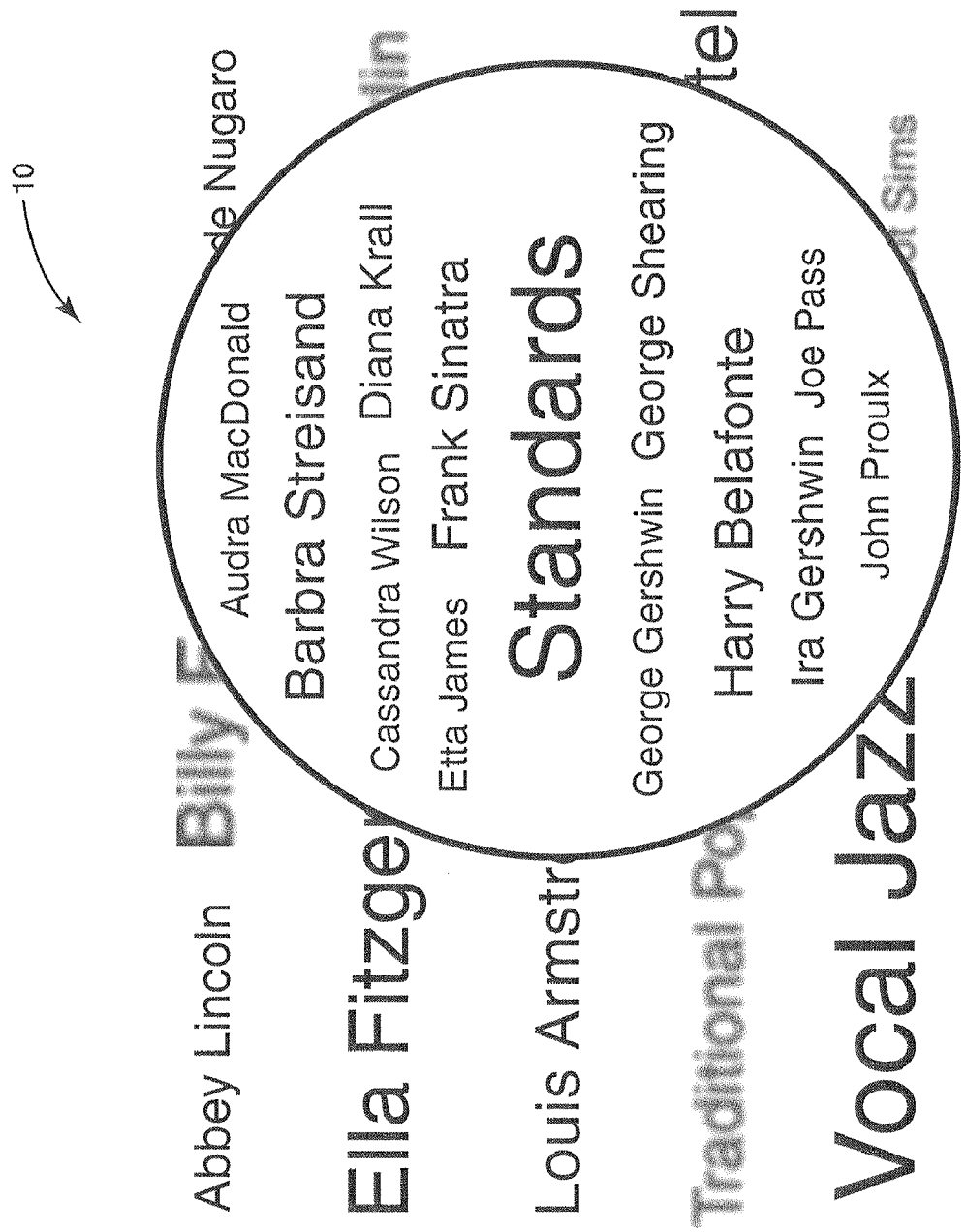

As illustrated in FIG. 6, the user may select one of the keyword search terms, which in this example is the media tag "Standards." After selecting the media tag "Standards," the user may choose to view the associated keywords, or keyword associations, for the selected keyword search term, as illustrated in FIG. 7. Alternatively, the associated keywords may automatically be presented to the user upon selecting the keyword search term. In this example, the associated keywords, or more specifically the associated media tags, for the selected media tag "Standards" are: "Audra MacDonald," "Barbra Streisand," "Cassandra Wilson," etc. In one embodiment, all of the associated keywords may be presented to the user for the selected keyword search term. Alternatively, the associated keywords presented to the user may correspond to the current value, or setting, of logical fuzziness for the selected keyword search term. In other words, only those associated keywords that will be considered for the fuzzy keyword search based on the current value of logical fuzziness for the selected keyword search term may be presented. Thus, if the logical fuzziness is set to a minimum value, or least ambiguous value, then no associated keywords for the selected keyword search term are presented. In contrast, if the logical fuzziness is set to a maximum value, or most ambiguous value, then all of the associated keywords for the selected keyword search term are presented.

Figure 8:
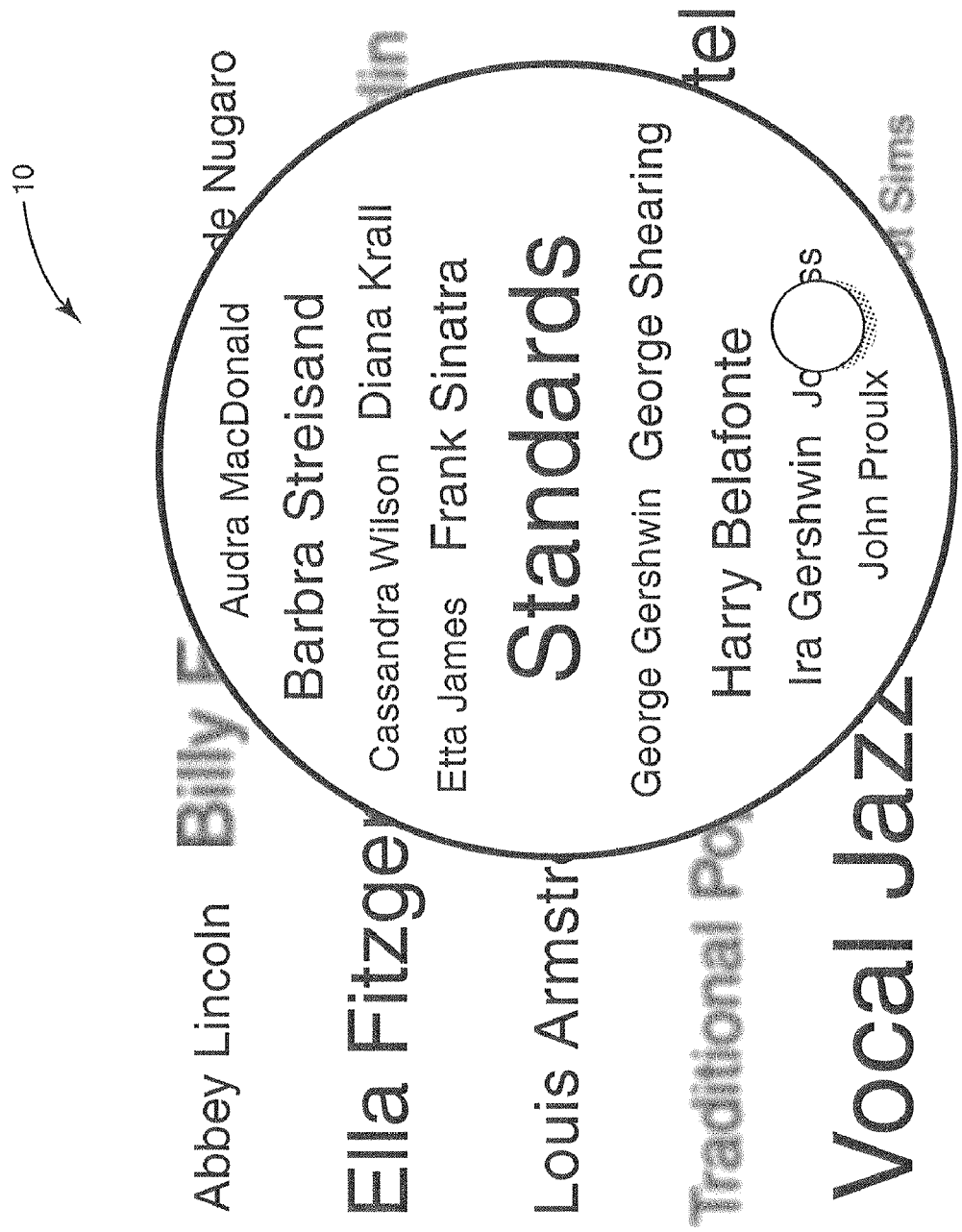
Figure 9:
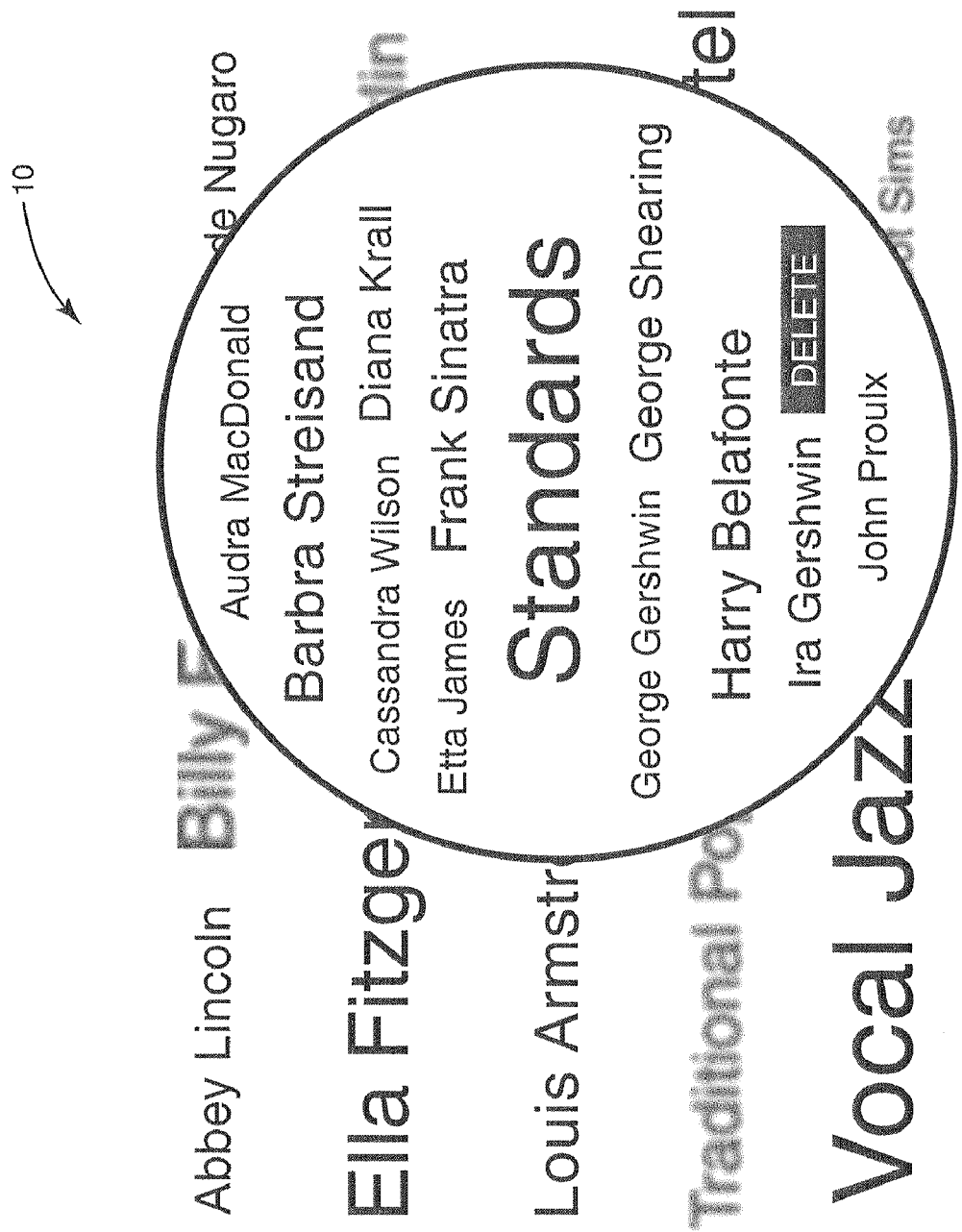
Figure 10:
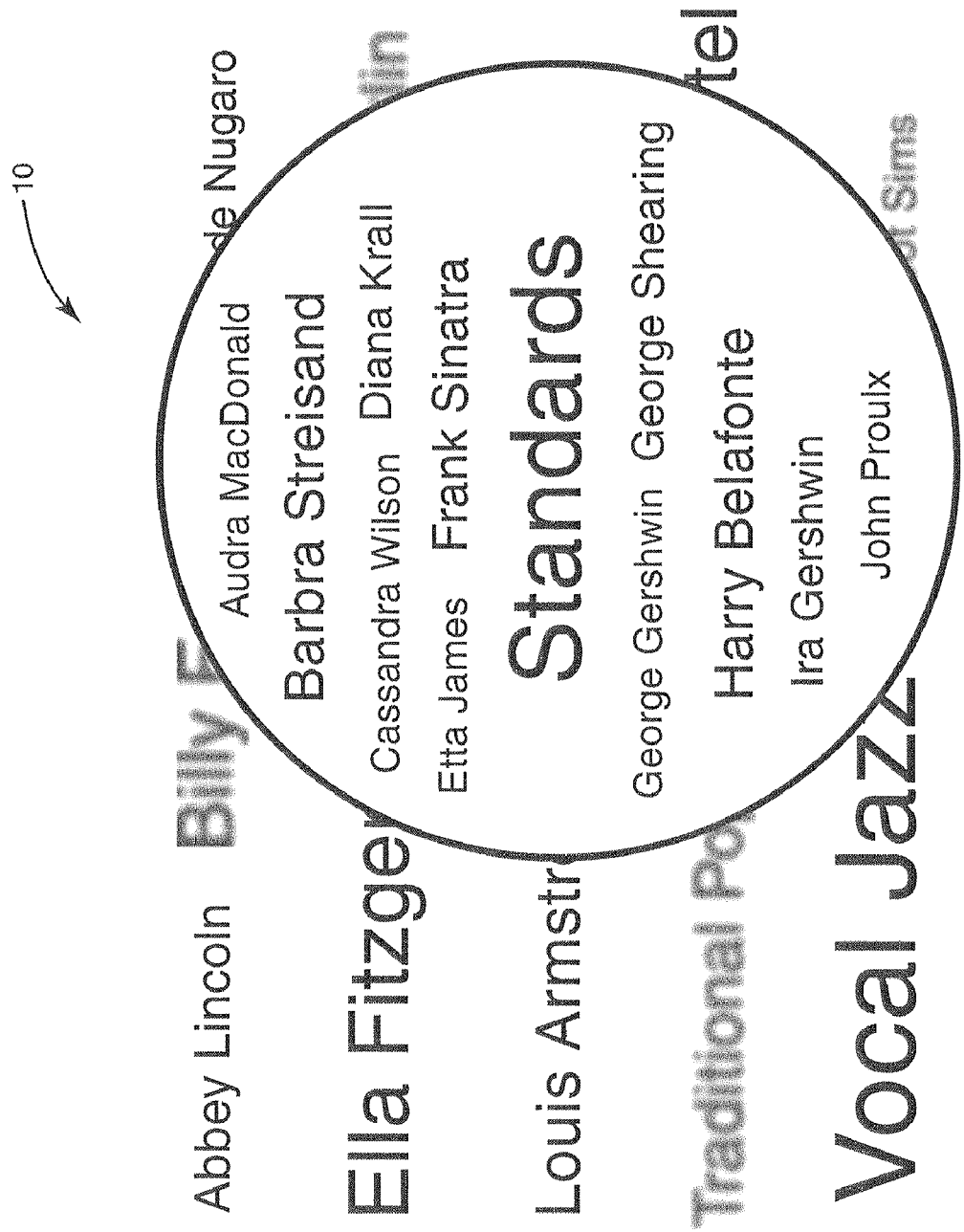

FIGS. 8 through 10 illustrate an exemplary process for deleting one of the associated keywords for the keyword search term "Standards," according to one embodiment of the present invention. More specifically, in this example, the user first selects the associated media tag "Joe Pass" as illustrated in FIG. 8. Next, as illustrated in FIG. 9, the user chooses to delete the media tag "Joe Pass." As a result, the media tag "Joe Pass" is no longer an associated media tag of the media tag "Standards," as illustrated in FIG. 10. As discussed above, this adjustment may be temporary or may have lasting effects. Note that a new associated keyword may be added for the keyword search term "Standards" in a similar fashion. For example, the user may select or otherwise identify a keyword and request that this keyword be added as an associated keyword for the keyword search term.

Figure 11:
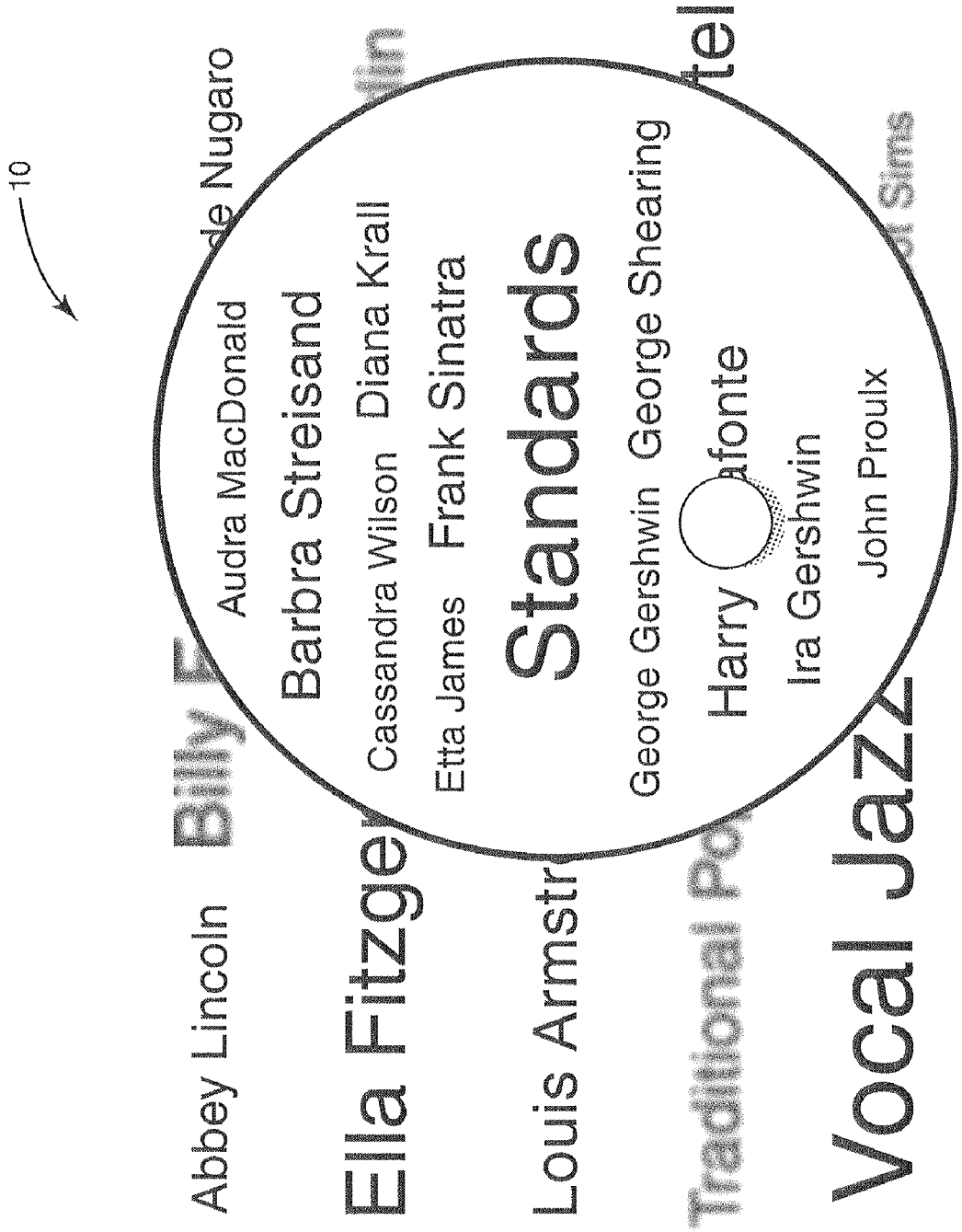
Figure 12:

FIGS. 11 and 12 illustrate an exemplary process for adjusting a weight assigned to one of the associated keywords for the keyword search term "Standards," according to one embodiment of the present invention. As discussed above, the weight assigned to the associated keyword may control the degree or strength of association between the associated keyword and the keyword search term, which in this example is the media tag "Standards." As discussed above, the strength of association may be used to determine whether the associated keywords are considered for a fuzzy keyword search based on the current logical fuzziness value of the associated keyword search term.

In this instance, the user has selected the associated keyword "Harry Belafonte" and has adjusted the weight assigned thereto. In one embodiment, the user adjusts the weight assigned to the keyword by resizing the keyword in the GUI 10 as described in U.S. patent application Ser. No. 11/955,534, entitled RESIZING TAG REPRESENTATIONS OR TAG GROUP REPRESENTATIONS TO CONTROL RELATIVE IMPORTANCE, which was filed on Dec. 13, 2007 and is hereby incorporated herein by reference in its entirety. Using this resizing technique, the user has increased the size of the associated media tag "Harry Belafonte" in order to increase the weight, or strength of association, to the media tag "Standards," as illustrated in FIG. 12. Note that the resizing technique discussed above is exemplary. Any number of techniques may be used to adjust the weights of the keywords, as will be appreciated by one of ordinary skill in the art upon reading this disclosure.

Figure 13:
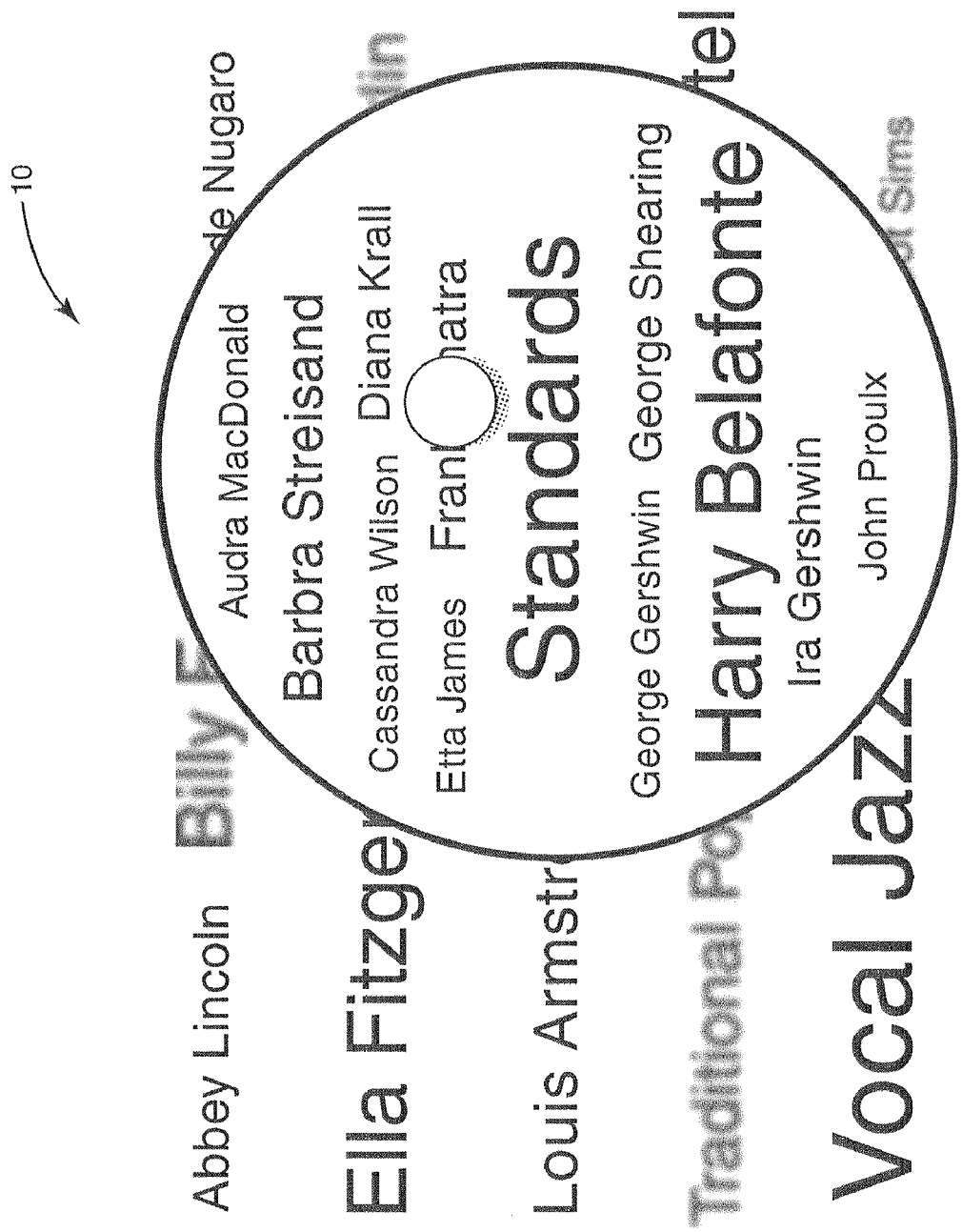
Figure 14:
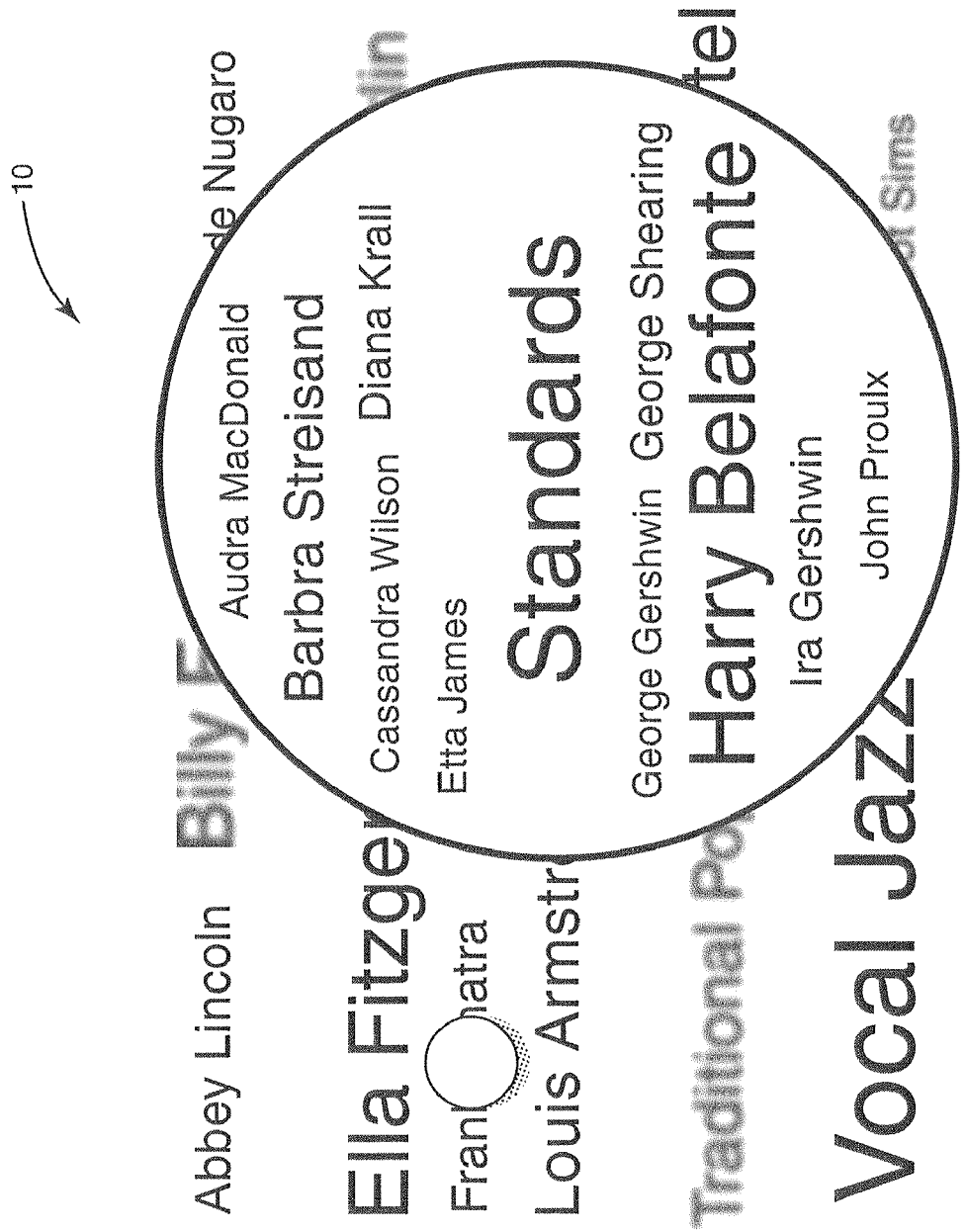

FIGS. 13 and 14 illustrate an exemplary process by which the user promotes one of the associated keywords that is nested within the ambiguity of a keyword search term to a new keyword search term according to one embodiment of the present invention. More specifically, in this example, the user has selected the media tag "Frank Sinatra" associated with the keyword search term "Standards," as illustrated in FIG. 13. Then, for example, by dragging and dropping the media tag "Frank Sinatra" from an associated keyword display area surrounding the keyword search term "Standards" to a primary keyword search term display area, the user promotes the media tag "Frank Sinatra" from being an associated media tag to a keyword search term, as illustrated in FIG. 14. The user may then interact with the media tag "Frank Sinatra" to increase or decrease its logical fuzziness, to view its associated keywords, to adjust its associated keywords, and the like. Once all adjustments are complete, the fuzzy keyword search is performed and corresponding search results are presented to the user.

FIG. 15 illustrates an exemplary process for adjusting the logical fuzziness of a group of keyword search terms in a group-wise fashion according to one embodiment of the present invention. In this example, a sliding bar control 14 is included in the GUI 10 and enables the user to adjust the logical fuzziness of the keyword search terms in a group-wise fashion. The sliding bar control 14 preferably operates to scale the individual logical fuzziness values for the keyword search terms to provide resulting logical fuzziness values for the keyword search terms. However, in an alternative embodiment, the sliding bar control 14 may be used to set the logical fuzziness values for each of the keyword search terms such that the logical fuzziness for each of the keyword search terms corresponds to the value indicated by the sliding bar control 14. Note that while the sliding bar control 14 is used in this example, the present invention is not limited thereto. Other mechanisms may be used.

In addition, while FIG. 15 focuses on using all of the keyword search terms as a single group, the present invention is not limited thereto. As a first example, the keyword search terms may be divided into a number of sub-groups, where the user is enabled to adjust the logical fuzziness of each of the keyword search terms in a sub-group in a group-wise fashion. As a second example, the user may be enabled to arbitrarily select two or more keyword search terms and adjust the logical fuzziness of the selected keyword search terms in a group-wise fashion.

FIGS. 16 through 22 illustrate various systems implementing the fuzzy keyword search function of the present invention. However, these systems are exemplary and are not intended to limit the scope of the present invention. Numerous variations and alternative implementations will be apparent to one of ordinary skill in the art upon reading this disclosure and are considered within the scope of the present invention.

Figure 16:
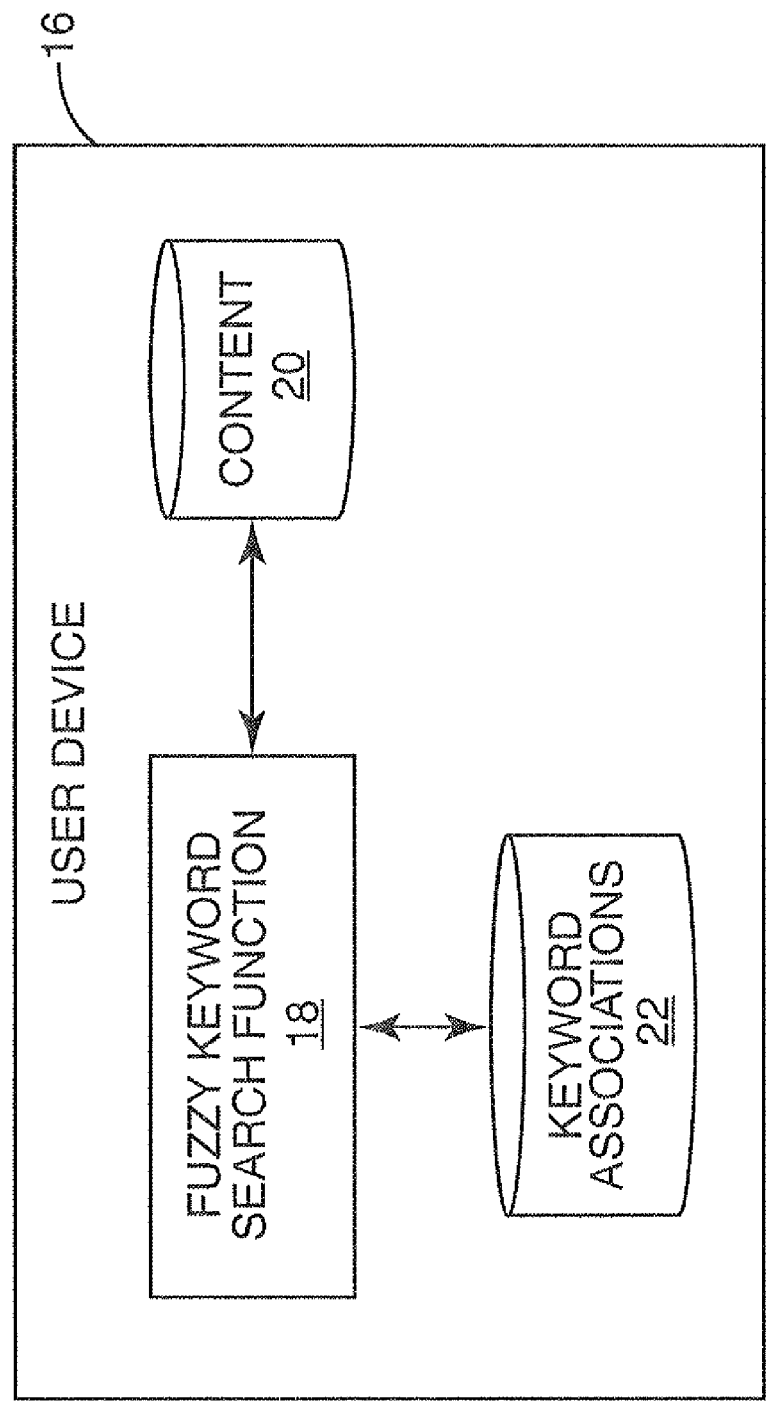
FIG. 16 illustrates a user device incorporating a fuzzy keyword search function according to a first exemplary embodiment of the present invention.

FIG. 16 illustrates a user device 16 including a fuzzy keyword search function 18 according to a first embodiment of the present invention. In general, the user device 16 may be, for example, a personal computer, a portable media player, a mobile telephone having multimedia capabilities such as an Apple® iPhone, or the like. The fuzzy keyword search function 18 is preferably implemented in software. However, the present invention is not limited thereto. In addition, the fuzzy keyword search function 18 may be a stand-alone function or application or embedded within another function or application such as, for example, a media player application.

In operation, the fuzzy keyword search function 18 operates to search a local content collection 20 based on one or more keyword search terms and keyword associations 22 in the manner described above. Again, the degree of logical fuzziness assigned to each of the one or more keyword search terms controls the extent to which associated keywords from the keyword associations 22 are used for the search. Note that while the keyword associations 22 are illustrated as being local to the user device 16, the present invention is not limited thereto. The keyword associations 22 may alternatively be stored remotely from the user device 16 by, for example, a central database.

Figure 17:
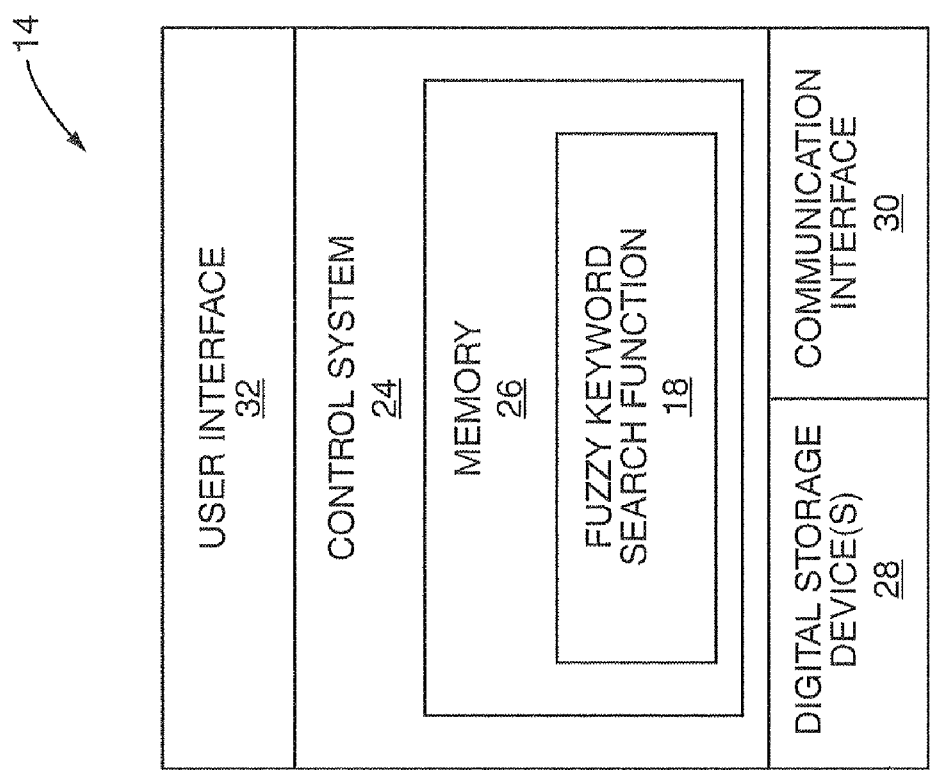
FIG. 17 is a block diagram of an exemplary embodiment of the user device of FIG. 16.

FIG. 17 is a block diagram of the user device 16 of FIG. 16 according to one embodiment of the present invention. In this embodiment, the user device 16 includes a control system 24 having associated memory 26. In this example, the fuzzy keyword search function 18 is implemented in software and stored within the memory 26. However, the present invention is not limited thereto. The fuzzy keyword search function 18 may alternatively be implemented in hardware or a combination of software and hardware. In addition, the user device 16 includes one or more digital storage devices 28 such as, for example, one or more hard disk drives, one or more removable memory devices such as a memory card, or the like. In one embodiment, the local content collection 20 (FIG. 16) and the keyword associations 22 (FIG. 16) are stored in the one or more digital storage devices 28. Alternatively, the local content collection 20 and/or the keyword associations 22 may be stored in the memory 26. The user device 16 may also include a communication interface 30 such as, for example, a Universal Serial Bus (USB) interface, a FireWire interface, an IEEE 802.11 wireless interface, a wireless telecommunications interface, or the like, or any combination thereof. Lastly, the user device 16 includes a user interface 32, which includes a display and one or more user input devices. The user interface 32 may include additional components such as, for example, a speaker, a microphone, or the like. Note that, in one embodiment, the user interface 32 includes a touch screen.

Figure 18:
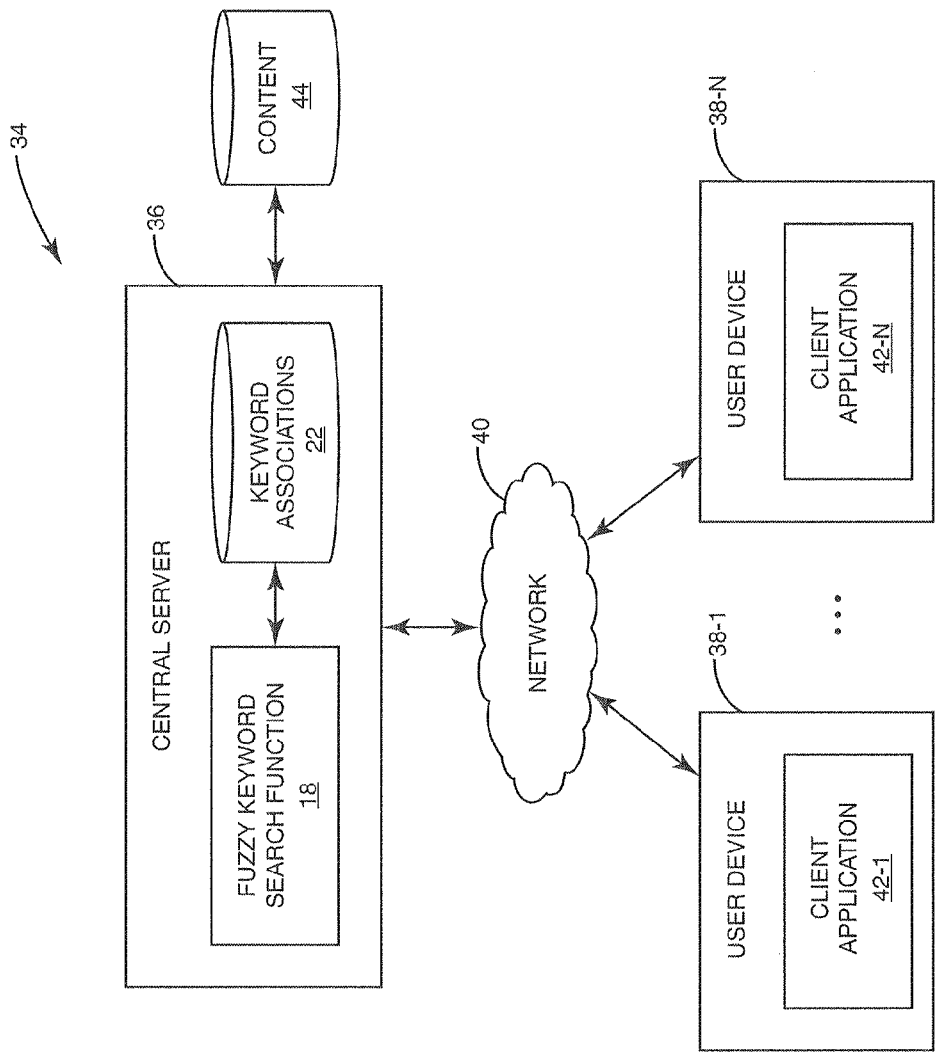
FIG. 18 illustrates a system incorporating a fuzzy keyword search function according to a second exemplary embodiment of the present invention.

FIG. 18 illustrates a system 34 implementing the fuzzy keyword search function 18 according to a second embodiment of the present invention. In general, the system 34 includes a central server 36 and one or more user devices 38-1 through 38-N communicatively coupled by a network 40. The network 40 may be a Wide Area Network (WAN), a Local Area Network (LAN), or the like and may include wired components, wireless components, or a combination of both wired and wireless components. In one embodiment, the network 40 is the Internet.

In this embodiment, the fuzzy keyword search function 18 is implemented on the central server 36. The central server 36 may also host the keyword associations 22. Alternatively, the keyword associations 22 may be stored remotely. In operation, users associated with the user devices 38-1 through 38-N interact with the fuzzy keyword search function 18 via client applications 42-1 through 42-N in order to initiate fuzzy keyword searching of content 44 in the manner described above. The client applications 42-1 through 42-N may be, for example, Internet browsers, custom applications, or the like. The content 44 may be local content stored by, or in association with, the central server 36. In addition or alternatively, the content 44 may include content stored by one or more remote systems. For example, the central server 36 may be that of a media distribution service from which users can optionally purchase and download media items such as songs and videos. As such, the content 44 may include media items available from the media distribution service. As another example, the content 44 may include content available to the users of the user devices 38-1 through 38-N via the Internet.

Figure 19:
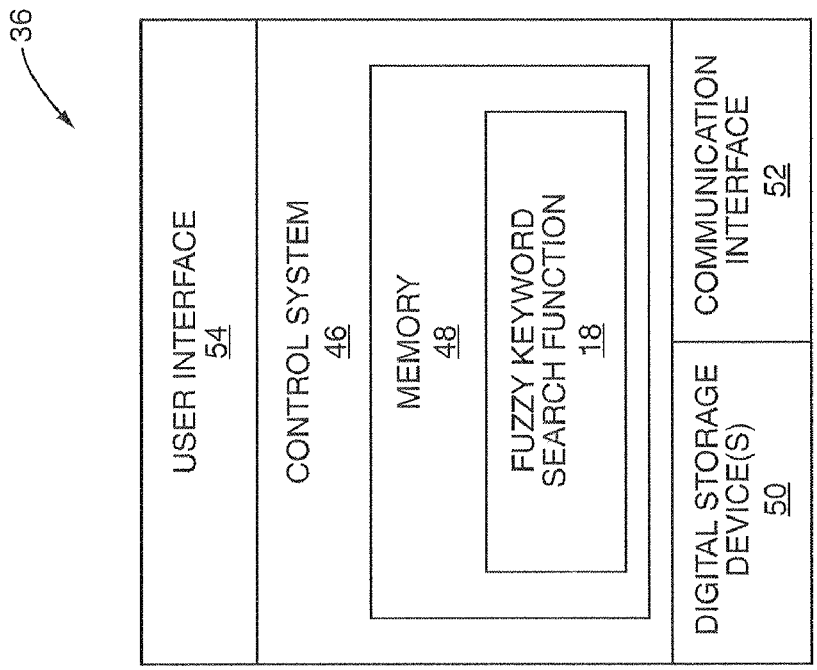
FIG. 19 is a block diagram of an exemplary embodiment of the central server of FIG. 18.

FIG. 19 is a block diagram of the central server 36 of FIG. 18 according to one embodiment of the present invention. In this embodiment, the central server 36 includes a control system 46 having associated memory 48. In this example, the fuzzy keyword search function 18 is implemented in software and stored within the memory 48. However, the present invention is not limited thereto. The fuzzy keyword search function 18 may alternatively be implemented in hardware or a combination of software and hardware. In addition, the central server 36 includes one or more digital storage devices 50 such as, for example, one or more hard disk drives, one or more removable memory devices such as a memory card, or the like. In one embodiment, the keyword associations 22 (FIG. 18) are stored in the one or more digital storage devices 50. Alternatively, the keyword associations 22 may be stored in the memory 48 or remotely from the central server 36. The central server 36 also includes a communication interface 52 communicatively coupling the central server 36 to the network 40 (FIG. 18). Lastly, the central server 36 includes a user interface 54, which may include components such as, for example, a display, one or more user input devices, and the like.

Figure 20:
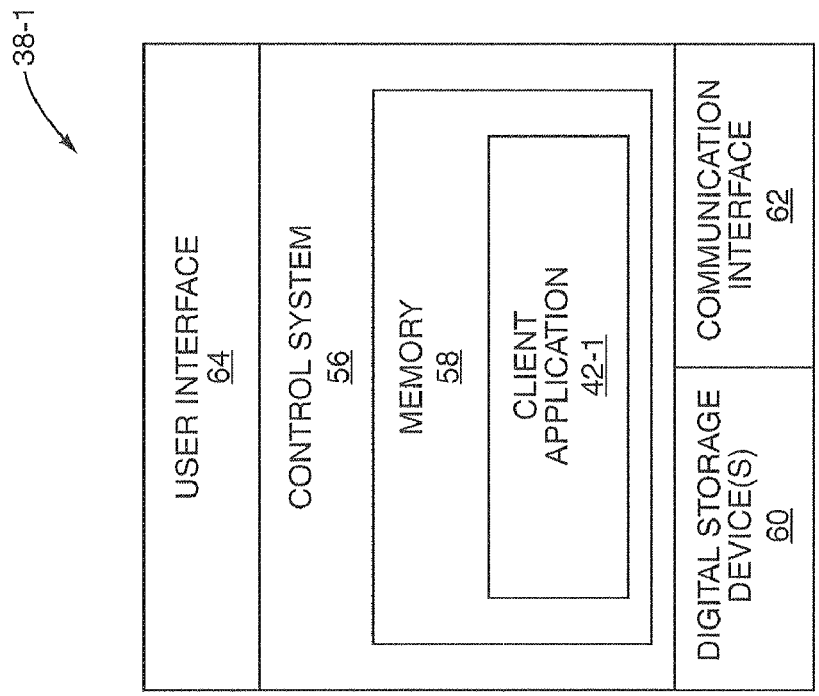
FIG. 20 is a block diagram of an exemplary embodiment of one of the user devices of FIG. 18.

FIG. 20 is a block diagram of the user device 38-1 of FIG. 18 according to one embodiment of the present invention. This discussion is equally applicable to the other user devices 38-2 through 38-N. In this embodiment, the user device 38-1 includes a control system 56 having associated memory 58. In this example, the client application 42-1 is implemented in software and stored within the memory 58. However, the present invention is not limited thereto. In addition, the user device 38-1 may include one or more digital storage devices 60 such as, for example, one or more hard disk drives, one or more removable memory devices such as a memory card, or the like. The user device 38-1 also includes a communication interface 62 communicatively coupling the user device 38-1 to the network 40 (FIG. 18). Lastly, the user device 38-1 includes a user interface 64, which includes a display and one or more user input devices. The user interface 64 may include additional components such as, for example, a speaker, a microphone, or the like. Note that, in one embodiment, the user interface 64 includes a touch screen.

Figure 21:
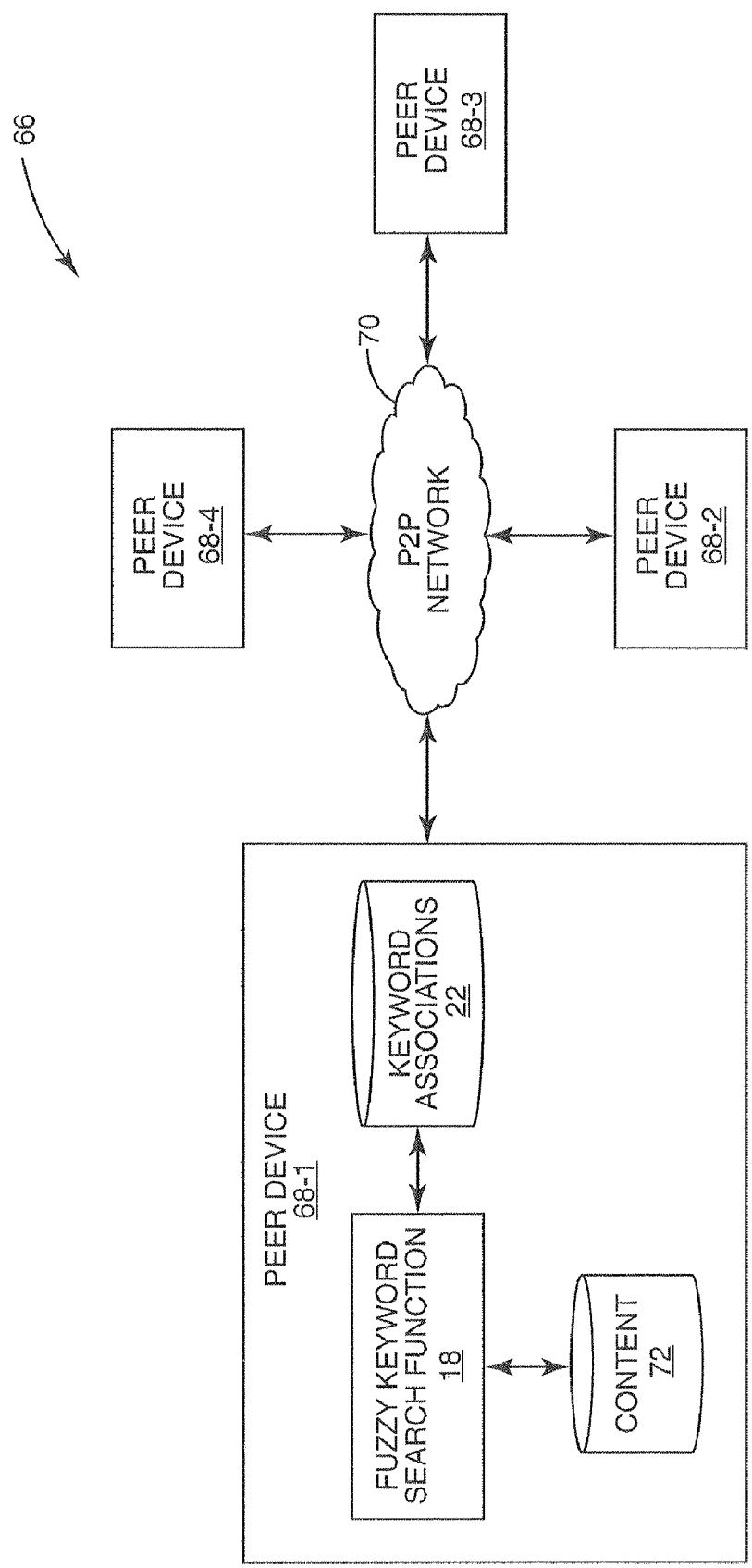
FIG. 21 illustrates Peer-to-Peer (P2P) system incorporating a fuzzy keyword search function according to a third exemplary embodiment of the present invention.

FIG. 21 illustrates a system 66 implementing the fuzzy keyword search function 18 according to a third embodiment of the present invention. In general, the system 66 includes a number of peer devices 68-1 through 68-4 communicatively coupled via a P2P network 70. Note that, in one embodiment, the P2P network 70 is an overlay network built on top of a communications network. The communications network may be, for example, a WAN, a LAN, or the like and may include wired components, wireless components, or a combination of both wired and wireless components. In one embodiment, the communications network is the Internet.

In this embodiment, as illustrated with respect to the peer device 68-1, the fuzzy keyword search function 18 is implemented on the peer devices 68-1 through 68-4. Using the peer device 68-1 as an example, the fuzzy keyword search function 18 enables the user of the peer device 68-1 to initiate fuzzy keyword searching of content 72 stored by the other peer devices 68-2 through 68-4 and, optionally, the content 72 stored locally by the peer device 68-1. In this embodiment, each of the peer devices 68-1 through 68-4 stores the keyword associations 22. The keyword associations 22 may be the same for each of the peer devices 68-1 through 68-4. Alternatively, each of the peer devices 68-1 through 68-4 may store its own version of the keyword associations 22. As another alternative, the keyword associations 22 may be stored in a distributed fashion among the peer devices 68-1 through 68-4. In an alternative embodiment, the keyword associations 22 may be stored in a central database accessible by the peer devices 68-1 through 68-4.

Figure 22:
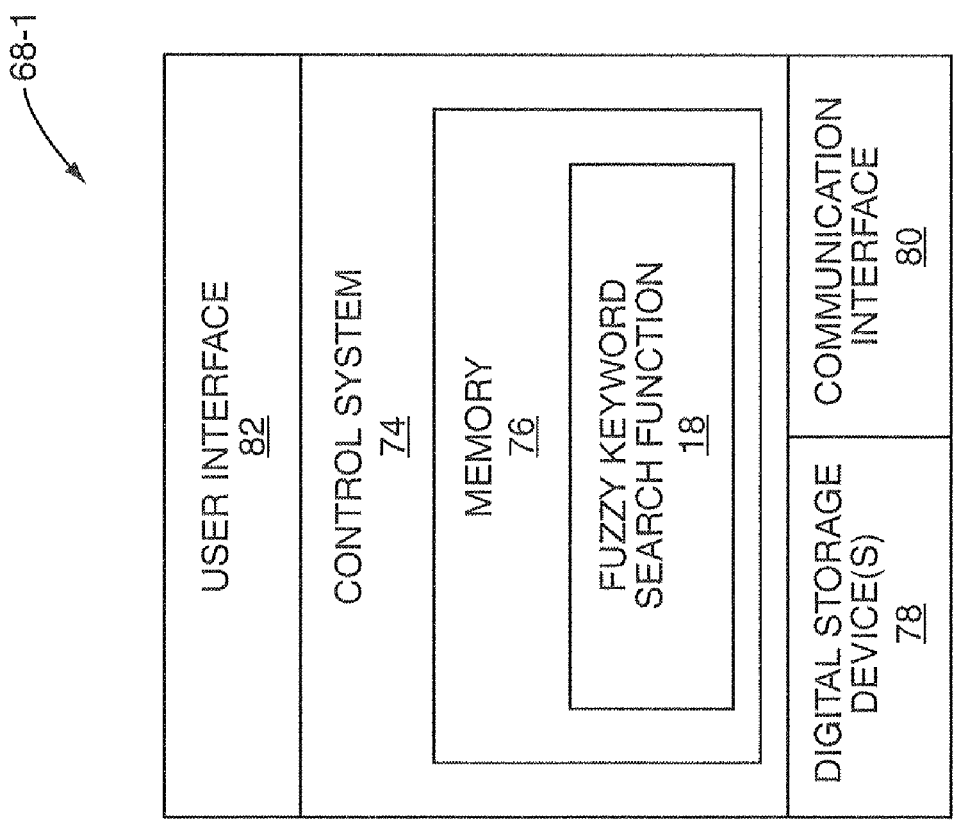
FIG. 22 is a block diagram of an exemplary embodiment of one of the peer devices of FIG. 21.

FIG. 22 is a block diagram of the peer device 68-1 of FIG. 21 according to one embodiment of the present invention. This discussion is equally applicable to the other peer devices 68-2 through 68-4. In this embodiment, the peer device 68-1 includes a control system 74 having associated memory 76. In this example, the fuzzy keyword search function 18 is implemented in software and stored within the memory 76. However, the present invention is not limited thereto. The fuzzy keyword search function 18 may alternatively be implemented in hardware or a combination of software and hardware. In addition, the peer device 68-1 includes one or more digital storage devices 78 such as, for example, one or more hard disk drives, one or more removable memory devices such as a memory card, or the like. In one embodiment, the content 72 (FIG. 21) and the keyword associations 22 (FIG. 21) are stored in the one or more digital storage devices 78. Alternatively, the content 72 and/or the keyword associations 22 may be stored in the memory 76. The peer device 68-1 may also include a communication interface 80 communicatively coupling the peer device 68-1 to the P2P network 70 (FIG. 21). Lastly, the peer device 68-1 includes a user interface 82, which includes a display and one or more user input devices. The user interface 82 may include additional components such as, for example, a speaker, a microphone, or the like. Note that, in one embodiment, the user interface 82 includes a touch screen.

Those skilled in the art will recognize improvements and modifications to the preferred embodiments of the present invention. All such improvements and modifications are considered within the scope of the concepts disclosed herein and the claims that follow.

What is claimed is:

1. A method of operation of a computing device comprising:
    presenting a keyword search term for a search of content to a user via a display associated with the computing device;
    adjusting a logical fuzziness of the keyword search term based on input by the user, the logical fuzziness of the keyword search term corresponding to an extent to which a plurality of associated keywords for the keyword search term are utilized for the search of the content; and
    providing visual feedback to the user via the display regarding the logical fuzziness of the keyword search term by controlling a visual fuzziness of the keyword search term presented to the user via the display such that the visual fuzziness of the keyword search term corresponds to the logical fuzziness of the keyword search term.

2. The method of claim 1 further comprising:
    performing the search of the content based on the keyword search term and the logical fuzziness of the keyword search term; and
    presenting results of the search to the user via the display.

3. The method of claim 2 wherein performing the search of the content comprises performing the search of the content based on the keyword search term and a number of keywords selected from the plurality of associated keywords based on the logical fuzziness of the keyword search term.

4. The method of claim 3 wherein the number of keywords selected from the plurality of associated keywords corresponds to the logical fuzziness of the keyword search term.

5. The method of claim 3 wherein the number of keywords selected from the plurality of associated keywords increases if the logical fuzziness of the keyword search term is increased by the user and decreases if the logical fuzziness of the keyword search term is decreased by the user.

6. The method of claim 2 wherein:
    adjusting the logical fuzziness of the keyword search term comprises setting the logical fuzziness of the keyword search term to one of a plurality of logical fuzziness settings based on input by the user; and
    performing the search of the content comprises:
        selecting one or more keywords from the plurality of associated keywords that have a degree of association with the keyword search term that is greater than a threshold corresponding to the one of the plurality of logical fuzziness settings assigned to the keyword search term; and
        performing the search of the content based on the keyword search term and the one or more keywords selected from the plurality of associated keywords for the keyword search term.

7. The method of claim 1 further comprising enabling the user to view at least a portion of the plurality of associated keywords for the keyword search term.

8. The method of claim 7 wherein enabling the user to view the at least a portion of the plurality of associated keywords for the keyword search term comprises presenting, to the user, one or more keywords from the plurality of associated keywords that are to be used for the search based on a current setting of the logical fuzziness of the keyword search term.

9. The method of claim 7 wherein enabling the user to view the at least a portion of the plurality of associated keywords for the keyword search term comprises presenting, to the user, all of the plurality of associated keywords.

10. The method of claim 1 further comprising adjusting the plurality of associated keywords for the keyword search term based on input from the user.

11. The method of claim 1 wherein each of the keyword search term and the plurality of associated keywords is a media tag and the content searched comprises media content.

12. The method of claim 1 wherein each of the keyword search term and the plurality of associated keywords is one of a group consisting of: a predefined keyword and a user-defined keyword.

13. The method of claim 1 wherein the content is at least one of a group consisting of local content and remote content.

14. A user device comprising:
    a) a user interface for receiving input from a user and displaying information to the user; and
    b) a control system, associated with the user interface, adapted to:
        i) display a keyword search term for a search of content to the user;
        ii) adjust a logical fuzziness of the keyword search term based on input by the user, the logical fuzziness of the keyword search term corresponding to an extent to which a plurality of associated keywords for the keyword search term are utilized for the search of the content, wherein the control system is further adapted to:
            increase the logical fuzziness of the keyword search term based on the input from the user; and
            decrease the logical fuzziness of the keyword search term based on the input from the user; and
        iii) control a visual fuzziness of the keyword search term presented to the user via the display such that the visual fuzziness of the keyword search term corresponds to the logical fuzziness of the keyword search term in order to provide visual feedback to the user regarding the logical fuzziness of the keyword search term, wherein the control system is further adapted to:
            increase the visual fuzziness of the keyword search term in response to increasing the logical fuzziness of the keyword search term; and
            decrease the visual fuzziness of the keyword search term in response to decreasing the logical fuzziness of the keyword search term.

15. A central server system comprising:
a) a communication interface communicatively coupling the central server system to a user device via a network, the user device associated with a user; and
b) a control system, associated with the communication interface, adapted to:
   i) effect presentation of a keyword search term for a search of content to the user at the user device;
   ii) receive input from the user, via the user device and the communication interface, corresponding to the keyword search term;
   iii) adjust a logical fuzziness of the keyword search term based on the input from the user, the logical fuzziness of the keyword search term corresponding to an extent to which a plurality of associated keywords for the keyword search term are utilized for the search of the content, wherein the logical fuzziness of the keyword search term is increased and decreased based on the input of the user; and
   iv) provide visual feedback to the user regarding the logical fuzziness of the keyword search term, the visual feedback including a visual fuzziness of the keyword search term, wherein the visual fuzziness is controlled to correspond to the logical fuzziness of the keyword search term, wherein the visual fuzziness of the keyword search term is increased in response to increasing the logical fuzziness of the keyword search term and the visual fuzziness of the keyword search term is decreased in response to decreasing the logical fuzziness of the keyword search term.

16. A non-transitory computer-readable medium storing software for instructing a controller of a computing device to:
   present a keyword search term for a search of content to a user via a display associated with the computing device;
   adjust a logical fuzziness of the keyword search term based on input by the user, the logical fuzziness of the keyword search term corresponding to an extent to which a plurality of associated keywords for the keyword search term are utilized for the search of the content; and
   provide visual feedback to the user via the display regarding the logical fuzziness of the keyword search term where the visual feedback includes a visual fuzziness of the keyword search term presented to the user via the display and the visual fuzziness is controlled such that the visual fuzziness of the keyword search term corresponds to the logical fuzziness of the keyword search term, wherein adjusting the logical fuzziness of the keyword search term and controlling the visual fuzziness of the keyword search term comprise:
   increasing the logical fuzziness of the keyword search term based on the input from the user and increasing the visual fuzziness of the keyword search term in response to increasing the logical fuzziness of the keyword search term; and
   decreasing the logical fuzziness of the keyword search term based on the input from the user and decreasing the visual fuzziness of the keyword search term in response to decreasing the logical fuzziness of the keyword search term.

17. A non-transitory computer-readable medium storing software for instructing a controller of a computing device to:
   identify a keyword search term for a search of content;
   adjust a logical fuzziness of the keyword search term based on input by a user, the logical fuzziness of the keyword search term corresponding to an extent to which a plurality of associated keywords for the keyword search term are utilized for the search of the content, wherein the logical fuzziness of the keyword search term is increased and decreased based on the input of the user;
   allow control of a visual fuzziness of the keyword search term presented to the user via the display such that the visual fuzziness of the keyword search term corresponds to the logical fuzziness of the keyword search term, wherein the visual fuzziness of the keyword search term is increased in response to increasing the logical fuzziness of the keyword search term and the visual fuzziness of the keyword search term is decreased in response to decreasing the logical fuzziness of the keyword search term;
   perform the search of the content based on the keyword search term and the logical fuzziness of the keyword search term; and
   present results of the search to the user.

* * * * *